United States Patent [19]

White, Sr. et al.

[11] Patent Number: 4,571,356

[45] Date of Patent: Feb. 18, 1986

[54] WATER SOLUBLE ONE-COMPONENT POLYMERIC RESIN BINDER SYSTEM FOR FIBERGLASS MATS

[75] Inventors: James T. White, Sr., Tuscaloosa; Dan J. Kennedy, Northport, both of Ala.

[73] Assignee: Reichhold Chemicals, Incorporated, White Plains, N.Y.

[21] Appl. No.: 744,844

[22] Filed: Jun. 13, 1985

Related U.S. Application Data

[60] Continuation of Ser. No. 593,286, Mar. 26, 1984, abandoned, which is a continuation of Ser. No. 425,657, Sep. 28, 1982, abandoned, which is a division of Ser. No. 160,436, Jun. 17, 1980, abandoned.

[51] Int. Cl.⁴ .......................... B32B 5/16; B32B 17/06
[52] U.S. Cl. .................................... 428/143; 428/141; 428/285; 428/286; 428/291; 428/489; 428/524
[58] Field of Search ............... 428/141, 143, 285, 286, 428/291, 524, 489; 525/163

[56] References Cited

U.S. PATENT DOCUMENTS 2,675,338  4/1954  Phillips ................................ 525/163
3,922,425  11/1975  Plumberg ........................... 428/489

*Primary Examiner*—Paul J. Thibodeau

[57] ABSTRACT

This invention covers a water soluble one-component fiberglass mat binder composition which comprises a urea-formaldehyde resin and polyvinyl acetate polymers and/or vinyl acrylic-polyvinyl acetate copolymers in the manufacture of asphalt shingles. The shingles of the invention are formed by the asphalt coating of a fiberglass mat in which the glass fiber mat has been coated with the binder composition and cured to bond the glass fibers together in the mat structure.

2 Claims, 1 Drawing Figure

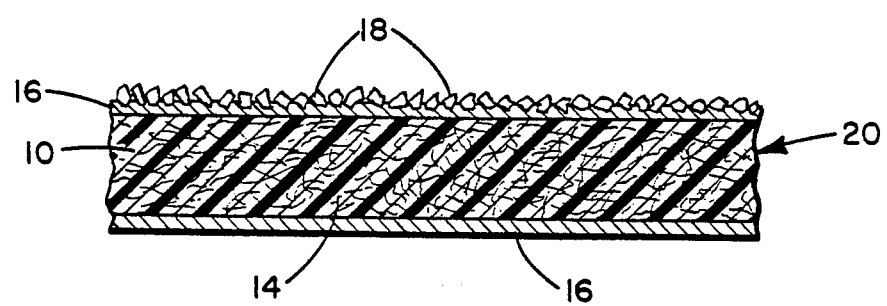

WATER SOLUBLE ONE-COMPONENT POLYMERIC RESIN BINDER SYSTEM FOR FIBERGLASS MATS

BACKGROUND OF THE INVENTION

This is a continuation of application Ser. No. 593,286 filed Mar. 26, 1984, now abandoned, which is a continuation of divisional application Ser. No. 425,657 filed Sept. 28, 1982 and now abandoned, which was a division of application Ser. No. 160,436 filed June 17, 1980, now abandoned, which in turn relate to fiberglass mat impregnating binder compositions for use in the formation of fiberglass shingle mats used in the manufacture of asphalt based shingles that have application in the roofing industry.

More particularly, the invention relates to fiberglass shingle mat binder compositions formed with water soluble one-component impregnating and coating composition of urea-formaldehyde resin containing polyvinyl acetate polymers and/or vinyl acrylic-polyvinyl acetate copolymers.

Asphalt roofing shingles have for many years been made from organic felt mats, principally formed from randomly arranged chopped cellulose fibers that are saturated with a hot asphalt and subsequently formed into asphalt roof shingles. In recent years, the use of wet laid glass fiber mats has been replacing the cellulose felt mats which provide increased service life, strength and improved fire resistance.

Since fiberglass lacks the natural inter-fiber bonding that is inherent in the natural organic fiber such as cellulose, the chopped glass fibers when randomly disposed in a mat must be bonded together by a suitable binder. The binder adhesively secures crossed glass fibers together contributing to good handling of the mats during processing into fiberglass shingles as well as providing the necessary physical performance properties such as strength, flexibility and long life that is required during roof installation and during the service life of the roof. Fiberglass shingles resist curl and blister wells and will not rot and because of the nonflammable nature of the fiberglass mats, they are given a Class A fire rating.

One of the problems in the formation of the fiberglass mats has been in the bonding together of the glass fibers in the production of the mats. In making conventional asphalt shingles using cellulose felt, the felt mat is impregnated with asphalt which when hardened gives it flexural strength of rigidity. In the making of the fiberglass shingles, the fiberglass mats are only coated with asphalt, rather than impregnated. While this results in an approximately 30% reduction in the amount of asphalt used, it also gives a significant decrease in the rigidity of the shingle. Therefore, the binder of the fiberglass mat must be capable of providing good mat strength for handling without loss of flexibility since the mats are only coated with asphalt. Also, the fiberglass mats require a binder that will produce physical properties of high inherent stability and good aging as well as good bonding of the glass fibers to each other and with the asphalt. Many resins have been used as binders for fiberglass mats, such as acrylic latices alone or in blends with urea-formaldehyde in two-component systems.

Other art known to the applicants is in U.S. patents to Phillips No. 2,675,338, and Plumberg No. 3,922,425.

It is an object of the present invention to provide a novel water soluble one-component fiberglass binder composition or system for use in bonding together glass fibers to produce flexible fiberglass mats.

It is a further object to provide a one-component fiberglass bonding composition or system that, when coated on glass fibers formed into a mat, cured and covered with asphalt, produces a finished fiberglass roofing shingle that exhibits excellent flexibility in cold weather climate application.

It is still a further object to provide a water soluble one-component fiberglass bonding composition or system that, when used in bonding the glass fibers of a fiberglass mat, imparts to the fiberglass roofing shingle produced therefrom a high tensile strength even after normal flexing during roofing applications.

It is another object to provide a one-component water soluble fiberglass bonding system of a urea-formaldehyde resin containing polyvinyl acetate and/or vinyl acrylic-polyvinyl acetate copolymer.

It is still another object to provide an asphalt coated fiberglass roofing shingle in which the glass fibers of the mat have been coated and bonded together with a urea-formaldehyde resin system that has had its pH adjusted with the addition of a pH modifier prior to the addition of polyvinyl acetate and/or vinyl acrylic-polyvinyl acetate copolymer.

These and other objects will become apparent from the following description, examples and claims when viewed and considered in conjunction with the following drawing:

The drawing shows partial cross-sectional view of a typical fiberglass shingle construction illustrating the glass fiber mat in which the glass fibers have been coated with the binder composition and cured with a top and a bottom asphalt coating and colored mineral granules embedded in the asphalt coating.

In the formation of fiberglass roofing shingles that have the construction as shown in the drawing, an elongated fiberglass mat 10 is formed from wet chopped glass strands 14 randomly assembled into a continuous unwoven mat that is placed in rolls ready for further processing. The glass strands in the wet mat are then subjected to a coating or impregnating of binder and cured to form the finished fiberglass mat 10. The finished fiberglass mat is coated top and bottom with a layer of asphalt 16, after which the top asphalt coating has colored mineral particles 18 partially embedded in the coating, and the mat is cut to the required size and shape to form the roofing shingle 20.

The water soluble resin binders of this invention are rendered flexible to avoid bond cracking and crazing, dusting, and loss of strength by the incorporation of a one-component water soluble urea-formaldehyde resin system, the composition of which incorporates from about 10 to about 75 percent by weight of polyvinyl acetate polymers and/or vinyl acrylic-polyvinyl acetate copolymers. The vinyl acrylate copolymer resins when added to the urea-formaldehyde thermosetting polymer impart to the finished fiberglass shingles good flexibility under all types of weather conditions and are particularly useful in applications in northern cold weather regions having temperatures at times below 40° F. The vinyl acrylate copolymer addition to the urea-formaldehyde thermosetting polymer system also has the advantage of curbing glass mat waste, breakage, and time losses during the asphalt coating application processing over small diameter rolls.

Two-component conventional urea-formaldehyde and polyvinyl acetate polymer blends are not storage stable and gel when blended together after a short period of time. Since polyvinyl acetate and/or vinyl acrylic-polyvinyl acetate copolymers tend to be of an acidic nature, they cause the urea-formaldehyde resin to gel in a short period of time. To overcome this problem and to provide a one-component resin system, the water soluble urea-formaldehyde resin is adjusted by the inclusion of a proper amount of pH modifier, prior to the addition of selected polyvinyl acetate and/or vinyl acrylic-polyvinyl acetate copolymers. This one-component system produces a fiberglass mat binder and impregnation and coating composition that has a much improved shelf-life of from about six to eight weeks at 25° C.

One-component impregnation and coating compositions are highly advantageous during the manufacture of asphalt shingles since a manufacturer does not have to have two separate storage tanks for the urea-formaldehyde resin and the polyvinyl acetate polymer or copolymer resins. The manufacturer does not have to blend the two components together and risk not achieving the blend desired for production and subsequent stopped or lost production until the right blend can be obtained. Likewise, a constant check must be maintained on both of the resins to make certain they have maintained their properties during storage especially during periods of start-up after shutdowns.

Exemplary of the water soluble one-component polymeric binder system of this invention is urea-formaldehyde resin mixed with polyvinyl acetate or vinyl acrylic and polyvinyl acetate copolymer or mixtures thereof. The exact composition of these resins may vary over a wide range with the limiting factor being viscosity of the resin. A viscosity of less than 3000 cps is preferred. The amount of polyvinyl acetate and/or vinyl acrylic-vinyl acetate copolymer resin used ranges from about 10 to about 75 percent by weight of the one-component system, with about 10 to about 35 percent preferred. If a vinyl acrylic-vinyl acetate copolymer is used, it has been found that a copolymer resin containing from about 1 to about 20 percent by weight vinyl acrylic and from about 80 to about 99 percent by weight vinyl acetate produces excellent results. The vinyl acrylic portion of the copolymer can be butyl acrylate which has been found to produce excellent results in the formulation of the one-component system. However, other acrylates may be used, such as methyl, ethyl, propyl and the like.

The use of a vinyl acrylic-polyvinyl acetate copolymer resin is preferred over using a straight polyvinyl acetate because it gives a shingle with better low temperature flexibility and water resistance.

Water soluble urea-formaldehyde resins suitable for the practice of this invention are formed by reacting from about 1.1 to about 5.0 moles of formaldehyde per mole of urea in a conventional manner. The preferred urea-formaldehyde resin has a mole ratio of formaldehyde to urea of about 1.1 to about 3.0. The molecular weight of the resin should be below 250.

The one-component polymeric binder system has a viscosity of from about 200 to about 700 cps with a preferred range of from 200 to 500 cps, a pH from about 6.5 to about 8.5 after 24 hours with the preferred pH range of 7.0 to 8.0, and has nonvolatiles content of approximately 45 to 65 percent with a preferred range of 50 to 55 percent, with a free formaldehyde content of less than 0.75%.

A number of volatile amines may be used to adjust the pH of the final resin composition. While ammonium hydroxide (or ammonia gas) is preferred, any one or combination of the following amines is suitable: triethanol amine, triethyl amine, diethylene triamine, triethylene tetramine as well as calcium and zinc hydroxide.

Fiberglass mats impregnated with the resin compositions of this invention are normally passed through an oven or other heating device to drive off the water and effect cure of the resin system. Typically the curing temperature ranges from about 350° to 550° F. for a length of time sufficient to lower the moisture content of the cured mat to less than 3% dry weight. However, from time to time, because of the particular processing equipment used in making and drying the mat, the mat is not heated to a high enough temperature for a long enough time to effect a complete cure of the resin system. In that instance, up to about 10% by weight of the binder system of a catalyst may be added to the one-component binder system prior to impregnation of the mat. The preferred catalysts are ammonium sulfate and/or ammonium chloride. However, it is understood that other catalysts typically used to cure urea-formaldehyde resins are suitable.

From about 18% to about 22% of one-component binder by weight based upon the total weight of the shingle is used for each shingle.

The water soluble one-component polymeric binder system may contain typical non-ionic surfactants and non-ionic colloidal stabilizers such as polyvinyl alcohol and other ingredients such as nonfoaming agents, humectants, extenders and the like.

EXAMPLE

One-component fiberglass binder compositions were prepared as follows:

A urea-formaldehyde resin was formed by charging a suitable reactor with 880 grams of formaldehyde, 350 grams of urea, 27 grams of diethylene tetramine (DETA), and 45 grams of hydrochloric acid. The charge was reacted to produce a 50° C. cloud point and then further reacted for two to four hours or until the average molecular weight of the reaction product is less than 250. The resin produced was then neutralized with sodium hydroxide and cooled to a temperature of from 20° to 30° C. At this point the reaction mixture was 50 to 54 percent nonvolatiles and had a viscosity of from 100 to 250 cps.

To 2500 grams of this reaction mixture was added ammonium hydroxide to adjust the pH to within a range of 7.9 to 8.2, and then 1250 grams of a vinyl acrylic-polyvinyl acetate emulsion was added to the reaction mixture under constant agitation. The vinyl acrylic-polyvinyl acetate emulsion was composed of 17 percent butyl acrylate monomer and 83 percent vinyl acetate monomer and stabilized. The pH of the reaction mixture was reduced with additional ammonium hydroxide to adjust the pH to 7.0 to 7.4 over a 24 hour period, where the reaction mixture stabilized. The resulting final product produced had a nonvolatiles content of approximately 50 to 54 percent and a viscosity of 400 to 500 cps with free-formaldehyde content of less than 0.75%.

The resulting binder composition exhibited unique properties of a homogeneous flexible film when spread and, when used as a fiberglass mat binder, produced mats which had much greater flexibility compared to mats treated with the pure urea-formaldehyde resin binder alone.

Tests showed that fiberglass mat made with the above one-component binder composition can be rolled up and stored for long periods of time, unrolled and fabricated into asphalt shingles with improved physical properties over asphalt fiberglass shingles containing fiberglass mats treated with a pure 100% urea-formaldehyde resin.

Several tests were run with binder compositions prepared within the ranges set forth above, and the copolymer binder compositions exhibited the following improvements when compared with a 100% pure urea-formaldehyde binder:

| Test Criteria | 100% U-F Pure Fiberglass Binder | | U-F/Vinyl Acrylic/ PVAc Copolymer Binder | |
| --- | --- | --- | --- | --- |
| Binder Film | Non Film Former Brittle Particles on Curing | | Film Former Flexible Film on Curing | |
| Tensile Strength 18 to 22% binder N.V. on Fiberglass Mat | Cross Machine 20–30#/in. wd. | Mch. Direction 30–40#/in. wd. | Cross Machine 20–30#/in. wd. | Mch. Direct 20–40#/in. wd. |
| Wet Tensile Retention (5' Water Soak) 18 to 22% binder N.V. on Fiberglass Mat | 60–65% Max. | | 75–85% Max. | |
| Elongation 18 to 22% binder N.V. on Fiberglass Mat | Near zero | | 1–3% | |
| Shelf life of binder @ 25° C. | 4 weeks | | 6 to 8 weeks | |
| Elmendorf Tears | 250–400 grams | | 350–600 grams | |
| Tabor Stiffness (Stiffness Units) | 100–120 | | 40–50 | |

While the invention has now been described with reference to certain preferred embodiments, and exemplified with respect thereto, the skilled artisan will appreciate that various changes, substitutions, modifications and omissions may be made without departing from the spirit thereof. Accordingly, it is intended that the scope of the present invention be limited solely by that of the following claims.

What is claimed is:

1. A flexible fiberglass shingle for application in the roofing industry formed from a fiberglass mat of chopped strands of fiberglass impregnated throughout with a cured polymeric resin blend, said polymeric resin blend consisting essentially of two ingredients (A) and (B) wherein (A) consists of from about 90 to about 25 percent by weight based upon the total weight of (A) and (B) used of a urea-formaldehyde resin wherein said urea-formaldehyde resin has a molecular weight below 250 and is formed by reacting from about 1.1 to about 3.0 moles of formaldehyde per mole of urea in a conventional manner, and ingredient (B) being from about 10 to about 75 percent by weight based upon the total weight of (A) and (B) of a polymeric material selected from the group consisting of polyvinyl acetate polymers and vinyl acrylic-vinyl acetate copolymers wherein said vinyl acrylic-vinyl acetate copolymers contain from about 1 to about 20 percent by weight butyl acrylate and from about 80 to about 99 percent by weight vinyl acetate and mixtures thereof, wherein the said water soluble storage stable polymeric blend has a viscosity ranging from about 200 to about 700 cps, a pH ranging from about 6.5 to about 8.5 after 24 hours, and a non-volatile content ranging from about 45 to about 65 percent based upon the total weight of said polymeric resin blend; said impregnated fiberglass mat coated on adjacent surfaces with asphalt and with pieces of mineral rock embedded in one of the asphalt surfaces.

2. A flexible fiberglass shingle for application in the roofing industry formed from a fiberglass mat of chopped strands of fiberglass impregnated throughout with a cured polymeric resin blend, said polymeric resin blend consisting essentially of two ingredients (A) and (B) wherein (A) consists of about 66 percent by weight based upon the total weight of (A) and (B) used of a urea-formaldehyde resin wherein said urea-formaldehyde resin has a molecular weight below 250 and is formed by reacting about 1.9 moles of formaldehyde per mole of urea in a conventional manner, and ingredient (B) being about 33 percent by weight based upon the total weight of (A) and (B) of a vinyl acrylic-vinyl acetate copolymer wherein said vinyl acrylic-vinyl acetate copolymer contains about 17 percent by weight butyl acrylate and about 83 percent by weight vinyl acetate, wherein the said water soluble storage stable polymeric blend has a viscosity ranging from about 400 to about 500 cps, a pH ranging from about 7.0 to about 7.4 after 24 hours, and a non-volatile content ranging from about 50 to about 54 percent based upon the total weight of said polymeric resin blend; said impregnated fiberglass mat coated on adjacent surfaces with asphalt and with pieces of mineral rock embedded in one of the asphalt surfaces.

* * * * *